(12) United States Patent
Kasazumi et al.

(10) Patent No.: US 8,064,115 B2
(45) Date of Patent: Nov. 22, 2011

(54) HOLOGRAM RECORDING/REPRODUCING APPARATUS

(75) Inventors: Kenichi Kasazumi, Osaka (JP); Tomoya Sugita, Nara (JP)

(73) Assignee: Panasonic Corporation, Osaka (JP)

( * ) Notice: Subject to any disclaimer, the term of this patent is extended or adjusted under 35 U.S.C. 154(b) by 739 days.

(21) Appl. No.: 12/049,844

(22) Filed: Mar. 17, 2008

(65) Prior Publication Data

US 2008/0225360 A1 Sep. 18, 2008

(30) Foreign Application Priority Data

Mar. 16, 2007 (JP) .................... 2007-068396

(51) Int. Cl.
*G03H 1/16* (2006.01)
(52) U.S. Cl. ........................................... 359/29
(58) Field of Classification Search .............. 359/10, 359/11, 29, 246, 247, 253, 21
See application file for complete search history.

(56) References Cited

U.S. PATENT DOCUMENTS

| | | | | |
|---|---|---|---|---|
| 5,225,920 | A * | 7/1993 | Kasazumi et al. ............. | 349/1 |
| 7,414,769 | B2 * | 8/2008 | Slinger ...................... | 359/245 |
| 2005/0243389 | A1 * | 11/2005 | Kihara ........................ | 359/9 |
| 2006/0238841 | A1 * | 10/2006 | Anderson et al. ............. | 359/10 |
| 2007/0183009 | A1 * | 8/2007 | Tsukagoshi et al. ........... | 359/10 |
| 2008/0024848 | A1 * | 1/2008 | Kawano et al. ............... | 359/21 |
| 2008/0106775 | A1 * | 5/2008 | Amitai et al. ................ | 359/13 |
| 2008/0247010 | A1 * | 10/2008 | Ogasawara et al. ............ | 359/3 |
| 2009/0219596 | A1 * | 9/2009 | Brotherton-Ratcliffe et al. ......................... | 359/29 |

FOREIGN PATENT DOCUMENTS

JP 3652340 3/2005

* cited by examiner

*Primary Examiner* — Frank G Font
(74) *Attorney, Agent, or Firm* — Wenderoth, Lind & Ponack, L.L.P.

(57) ABSTRACT

A hologram recording/reproducing apparatus includes: a coherent light source; a spatial light modulator which spatially modulates light from the coherent light source; a Fourier transform lens which concentrates light modulated by the spatial light modulator upon a hologram medium; and a two-dimensional light-receiving element array which receives light from the hologram medium. The spatial light modulator is divided into a reference light area and a signal light area, and the divergence angle of reference light emitted from the reference light area is wider than the divergence angle of signal light emitted from the signal light area.

16 Claims, 9 Drawing Sheets

HOLOGRAM RECORDING/REPRODUCING APPARATUS

BACKGROUND OF THE INVENTION

1. Field of the Invention

The present invention relates to a hologram recording/reproducing apparatus which is used for an external storage in a computer, an audio-visual information storage, or the like, and using holography, records and/or reproduces a hologram in and/or from a hologram medium.

2. Description of the Background Art

A compact disk (CD) is capable of recording 74-minute music data or 650-MB digital data, using a light source with a wavelength of 780 nm and an optical system including an objective lens with a numerical aperture of 0.45. A digital versatile disk (DVD) is capable of recording an MPEG2-system dynamic image for two and a quarter hours, or 4.7-GB digital data, using a light source with a wavelength of 650 nm and an optical system including an objective lens with a numerical aperture of 0.6.

In recent years, a high-definition dynamic image with a horizontal resolution of 1000 or above has been broadcast, and the performance of personal computers has been increasingly higher. Such a factor has made a greater demand for a high-density and large-capacity optical disk. In response to this, an optical disk unit or the like is offered which includes a light source with a wavelength of approximately 400 nm and an optical system including an objective lens with a numerical aperture of 0.85. In this unit, one side of a disk has a recording capacity beyond 20 GB. Hence, an optical disk unit is provided with a light source having a shorter wavelength and an objective lens having a higher numerical aperture, so that its data recording density can be heightened on a disk.

However, there is a limit to such a short-wavelength of a light source and a high-numerical-aperture of an objective lens. This approach to a high-density recording has nearly reached a dead end. Specifically, within a wavelength range of 400 nm or below, a glass material used for a lens disperses wavelengths more widely. This makes it difficult to control its aberration. In addition, the art of a solid immersion lens has been developed for the purpose of realizing a higher numerical aperture. In this art, a lens working distance, or the distance between a lens and a disk, becomes extremely short (approximately 50 nm). This causes the problem of making it harder to exchange disks or such with one another.

Therefore, in order to solve those problems and enhance the recording density of data on a disk, great attention has been paid to a holographic recording art. For example, FIG. 9 shows a hologram recording/reproducing apparatus provided with the system proposed by Horikome and others. It is a schematic view showing the configuration of an optical system of this hologram recording/reproducing apparatus (e.g., refer to Japanese Patent No. 3652340).

The hologram recording/reproducing apparatus shown in FIG. 9 includes a laser light source 201, an isolator 209, a collimating optical system 207, a polarization beam splitter 208, a spatial light modulator 202, a Fourier transform lens 203, a quarter-wave plate 204, and a two-dimensional light-receiving element array 206. A beam of light emitted from the laser light source 201 is collimated by the collimating optical system 207. Then, it is reflected at the polarization beam splitter 208 and is incident upon the spatial light modulator 202.

As can be seen from its plan view in the upper part of FIG. 9, the spatial light modulator 202 is divided into pixels each of which has a width "d". It turns the polarization direction of light which irradiates each pixel individually according to an input electric signal. Then, it reflects the light. This spatial light modulator 202 is formed, for example, by a liquid-crystal device called a reflection-type LCOS device. This spatial light modulator 202 is divided concentrically into an external reference light area 221 and an internal signal light area 222. In the internal signal light area 222, the polarization direction of light reflected by each pixel is modulated in accordance with a signal to be recorded.

The light reflected at each pixel after its polarization direction has been turned goes straight again through the polarization beam splitter 208. Then, it passes through the quarter-wave plate 204. Thereafter, it is converged upon a hologram disk 205 by means of the Fourier transform lens 203 and turns into signal light. In contrast, the light reflected at each pixel whose polarization direction remains unturned is reflected again by the polarization beam splitter 208. Then, it returns toward the laser light source 201 and is absorbed by the isolator 209.

On the other hand, in the reference light area 221, the polarization direction of reflected light from each pixel is turned according to a specific pattern. The light which has passed through the polarization beam splitter 208 is guided to the hologram disk 205 and turns into reference light.

The hologram disk 205 is formed by sandwiching a hologram recording material 251 between transparent substrates. An interference fringe produced by the intersecting reference light and signal light is recorded as a hologram in the hologram recording material 251. The hologram recording material 251 is made, for example, of a photopolymer with a photo-curing property. The refractive index of this photopolymer is varied and fixed according to the fine intensity distribution of the interference fringe, so that the hologram can be recorded. Every time a hologram is recorded, the hologram disk 205 is rotated to record hologram rows one after another.

When reproducing a signal, the light of the signal light area 222 of the spatial light modulator 202 is cut off, and only the light modulated in the reference light area 221 irradiates the hologram disk 205. The produced diffracted light is detected by the two-dimensional light-receiving element array 206.

This system has the following characteristic. At the time of recording and reproduction, reference light forms a minute speckle pattern on the hologram disk 205. This makes it possible to record a large number of holograms in slightly different positions on the hologram disk 205. On the hologram plane (the focal plane of the Fourier transform lens 203), reference light has a light-intensity distribution obtained by giving a Fourier transformation to the distribution pattern of light on the plane of the spatial light modulator 202. On the spatial light modulator 202, the light is modulated in a random pattern, and thus, a random speckle pattern is formed on the hologram plane alike. When reproducing a signal, reproduction light is not produced until a speckle pattern of reference light at the recording time coincides with a speckle pattern of reference light at the reproduction time.

At this time, if the positional shift of the recorded hologram from the reference light at the reproduction time becomes a speckle size or greater, the quantity of reproduction signal light is conspicuously reduced. In practice, the speckle size is $\lambda/2NA$, if the numerical aperture of the Fourier transform lens 203 is NA and the wavelength of light is $\lambda$. For example, if the numerical aperture of the Fourier transform lens 203 is 0.6 and the wavelength of the laser light source 201 is 400 nm, then the speckle size is 0.33 microns. This helps record different holograms in positions apart in micron order from each other.

Another condition for selecting and reproducing a hologram as steeply as described above is to thicken the hologram disk 205 sufficiently. As described earlier, the positional shift of the reference light at the recording and reproduction times decreases the signal-light quantity. This is because diffracted light from different parts in the thickness directions of the hologram disk 205 interferes and negates each other. If the hologram disk 205 is not thick enough, adjacent holograms need to be recorded at a longer interval, thus hindering enlargement of the recording capacity.

The conventional hologram recording optical system of FIG. 9 has the problem of recording only a part of an interference fringe in the thickness directions of a thick recording medium which prevents the recording capacity from being increased. FIG. 10 shows a schematic configuration of a recording beam inside of the hologram disk 205 in the optical system of FIG. 9.

As shown in FIG. 10, the light from the pixels of the signal light area 222 and the reference light area 221 spreads through a diffraction phenomenon caused by the pixel apertures. Then, it turns into a parallel beam having a finite width and interferes with each other in the hologram recording material 251. In FIG. 10, the area of an interference fringe is shown by a slashed triangle having a lateral width of 0.4 mm and a height of 0.47 mm in the thickness directions. These numeric values are obtained when the wavelength of the laser light source 201 is 400 nm, the focal length of the Fourier transform lens 203 is 10 mm and the pixel width d of the spatial light modulator 202 is 10 microns.

As can be seen from FIG. 9 and FIG. 10, even if a thick hologram medium (the hologram recording material 251) is employed in the optical system having the configuration of FIG. 9, then the interference fringe is limited to the vicinity of the focal plane of the Fourier transform lens 203. This makes it impossible to secure a practically-effective hologram-medium thickness as well as a sufficient positional selectivity. This causes the problem of hindering enlargement of the recording capacity.

SUMMARY OF THE INVENTION

It is an object of the present invention to provide a hologram recording/reproducing apparatus which is capable of improving the quality of a reproduction signal and recording a large number of holograms to increase a recording capacity.

A hologram recording/reproducing apparatus according to an aspect of the present invention includes: a coherent light source; a spatial light modulator which spatially modulates light from the coherent light source; a Fourier transform lens which concentrates light modulated by the spatial light modulator upon a hologram medium; and a two-dimensional light-receiving element array which receives light from the hologram medium, in which: the spatial light modulator is divided into a reference light area and a signal light area; and the divergence angle of reference light emitted from the reference light area is wider than the divergence angle of signal light emitted from the signal light area.

The hologram recording/reproducing apparatus according to the present invention is capable of enhancing the quality of a reproduction signal, as well as recording a large number of holograms to increase a recording capacity.

These and other objects, features and advantages of the present invention will become more apparent upon reading of the following detailed description along with the accompanied drawings.

DESCRIPTION OF THE PREFERRED EMBODIMENTS

Embodiments of the present invention will be below described with reference to the drawings.

First Embodiment

Figure 1:
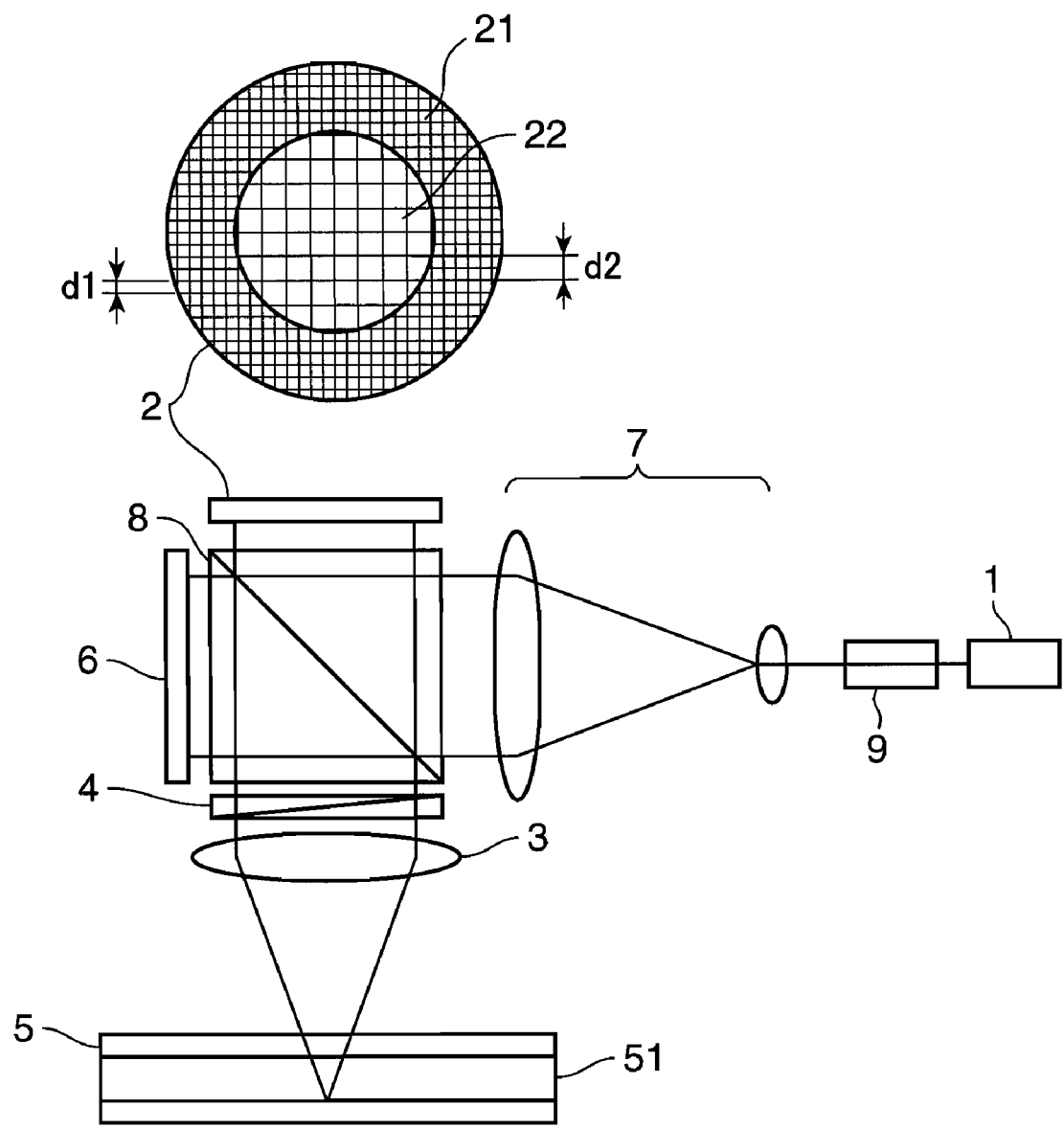
FIG. 1 is a schematic view showing the configuration of a holographic optical-information recording/reproducing apparatus according to a first embodiment of the present invention.

FIG. 1 is a schematic view showing the configuration of a holographic optical-information recording/reproducing apparatus corresponding to the hologram recording/reproducing apparatus according to a first embodiment of the present invention. In this embodiment, the principle of a hologram recording/reproducing operation is the same as the section of a prior art, and thus, as follows.

The holographic optical-information recording/reproducing apparatus according to this embodiment includes a laser light source 1, an isolator 9, a collimating optical system 7, a polarization beam splitter 8, a spatial light modulator 2, a Fourier transform lens 3, a hologram disk 5, a quarter-wave plate 4, and a two-dimensional light-receiving element array 6. The laser light source 1 is the coherent light source which outputs a laser beam as coherent light. A beam of light emitted from the laser light source 1 passes through the isolator 9 and is collimated by the collimating optical system 7. Then, it is reflected at the polarization beam splitter 8 and is incident upon the spatial light modulator 2.

As can be seen from its plan view in the upper part of FIG. 1, the spatial light modulator 2 includes a reference light area 21 and a signal light area 22. The reference light area 21 is divided into pixels each of which has a width (a longitudinal length and a lateral length) d1, and the signal light area 22 is divided into pixels each of which has a width (a longitudinal length and a lateral length) d2. In the signal light area 22, the spatial light modulator 2 turns the polarization direction of light which irradiates each pixel individually according to an input electric signal. Then, it reflects the light. In the reference light area 21, it holds a fixed modulation pattern. This spatial light modulator 2 is formed, for example, by a liquid-crystal device called a reflection-type LCOS (liquid-crystal on silicon) device. It can spatially modulate light from the coherent light source. Incidentally, the spatial light modulator is not limited especially to the LCOS device with a silicon substrate. The silicon substrate is not used in a transmission-type liquid-crystal device.

As described above, the spatial light modulator 2 is divided concentrically into an external reference light area 21 and an internal signal light area 22. In the internal signal light area 22, the polarization direction of light reflected by each pixel is modulated in accordance with a signal to be recorded. The light reflected at each pixel after its polarization direction has been turned goes straight again through the polarization beam splitter 8. Then, it passes through the quarter-wave plate 4. Thereafter, it is converged upon a hologram disk 5 by means of the Fourier transform lens 3 and turns into signal light. In contrast, the light reflected at each pixel whose polarization direction remains unturned is reflected again by the polarization beam splitter 8. Then, it returns toward the laser light source 1 and is absorbed by the isolator 9.

On the other hand, in the reference light area 21, the polarization direction of reflected light from each pixel is turned according to a specific pattern. The light which has passed through the polarization beam splitter 8 passes through the quarter-wave plate 4 and the Fourier transform lens 3. Then, it is guided to the hologram disk 5 and turns into reference light.

The hologram disk 5 is the hologram medium shaped like a disk and is formed by sandwiching a hologram recording material 51 between transparent substrates. An interference fringe produced by the intersecting reference light and signal light is recorded as a hologram in the hologram recording material 51. The hologram recording material 51 is made, for example, of a photopolymer with a photo-curing property. The refractive index of this photopolymer is varied and fixed according to the fine intensity distribution of the interference fringe, so that the hologram can be recorded. In this embodiment, every time a hologram is recorded, the hologram disk 5 is rotated to record hologram rows one after another.

When reproducing a signal, the light of the signal light area 22 of the spatial light modulator 2 is cut off, and only the light modulated in the reference light area 21 irradiates the hologram disk 5. The produced diffracted light is detected by the two-dimensional light-receiving element array 6.

The holographic optical-information recording/reproducing apparatus according to this embodiment is characterized in that each pixel in the reference light area 21 of the spatial light modulator 2 is smaller than each pixel in the signal light area 22. In other words, the width d1 of each pixel of the reference light area 21 is smaller than the width d2 of each pixel of the signal light area 22.

Figure 2:
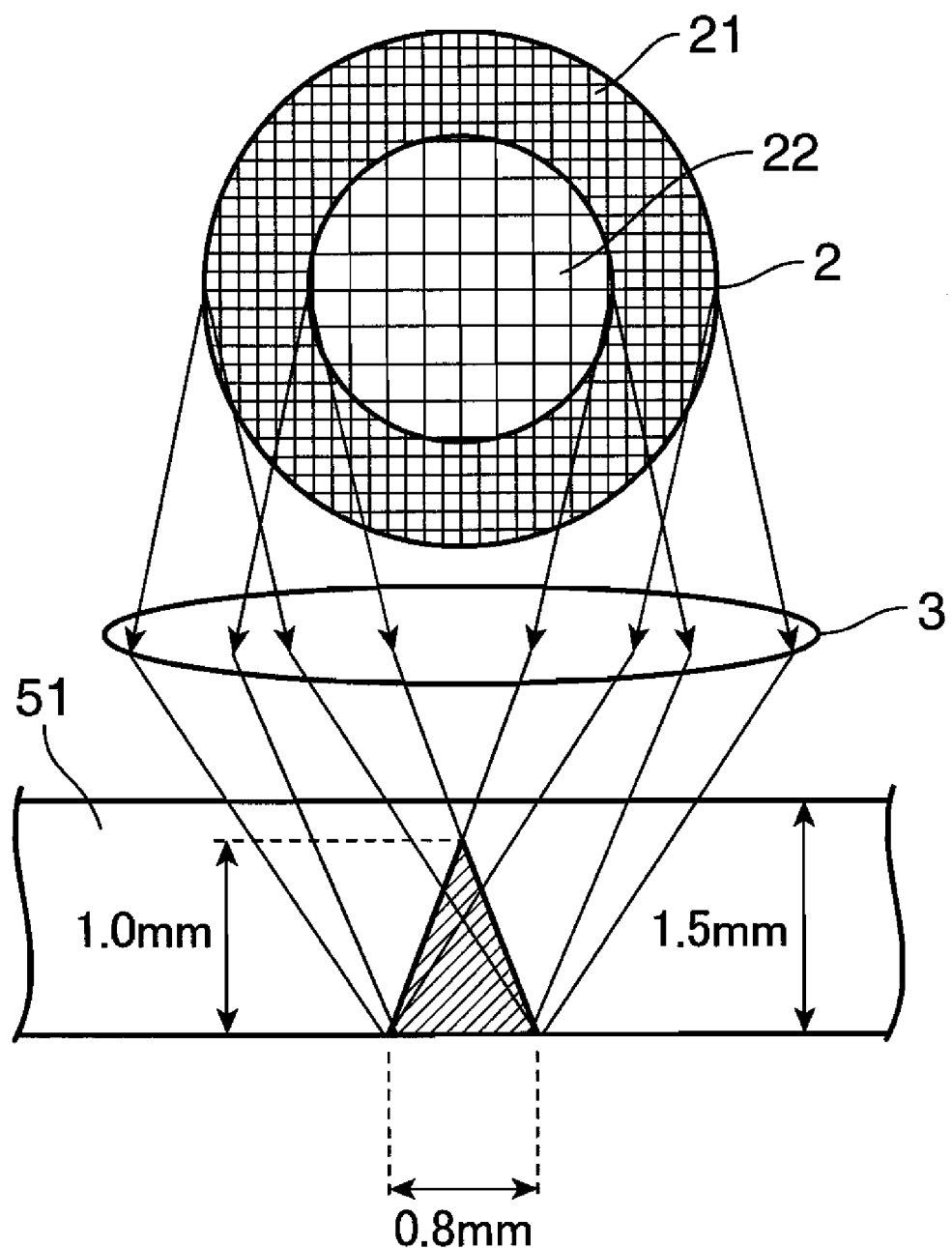
FIG. 2 is a schematic sectional view showing a state of a light beam inside of a hologram medium in the holographic optical-information recording/reproducing apparatus according to the first embodiment of the present invention.

When recording a hologram, the holographic optical-information recording/reproducing apparatus of FIG. 1 propagates a light beam inside of the hologram medium (the hologram disk 5). FIG. 2 is a schematic sectional view showing a state of this light beam. The light emitted from the spatial light modulator 2 is radiated at a divergence angle which corresponds to the width d1, d2 of each pixel of the spatial light modulator 2. This divergence angle is $2\lambda/D$ when the width of each pixel of the spatial light modulator 2 is D (d1 or d2) and the wavelength of the laser light source 1 is $\lambda$. It is inversely proportional to the width of each pixel of the spatial light modulator 2.

Figure 10:
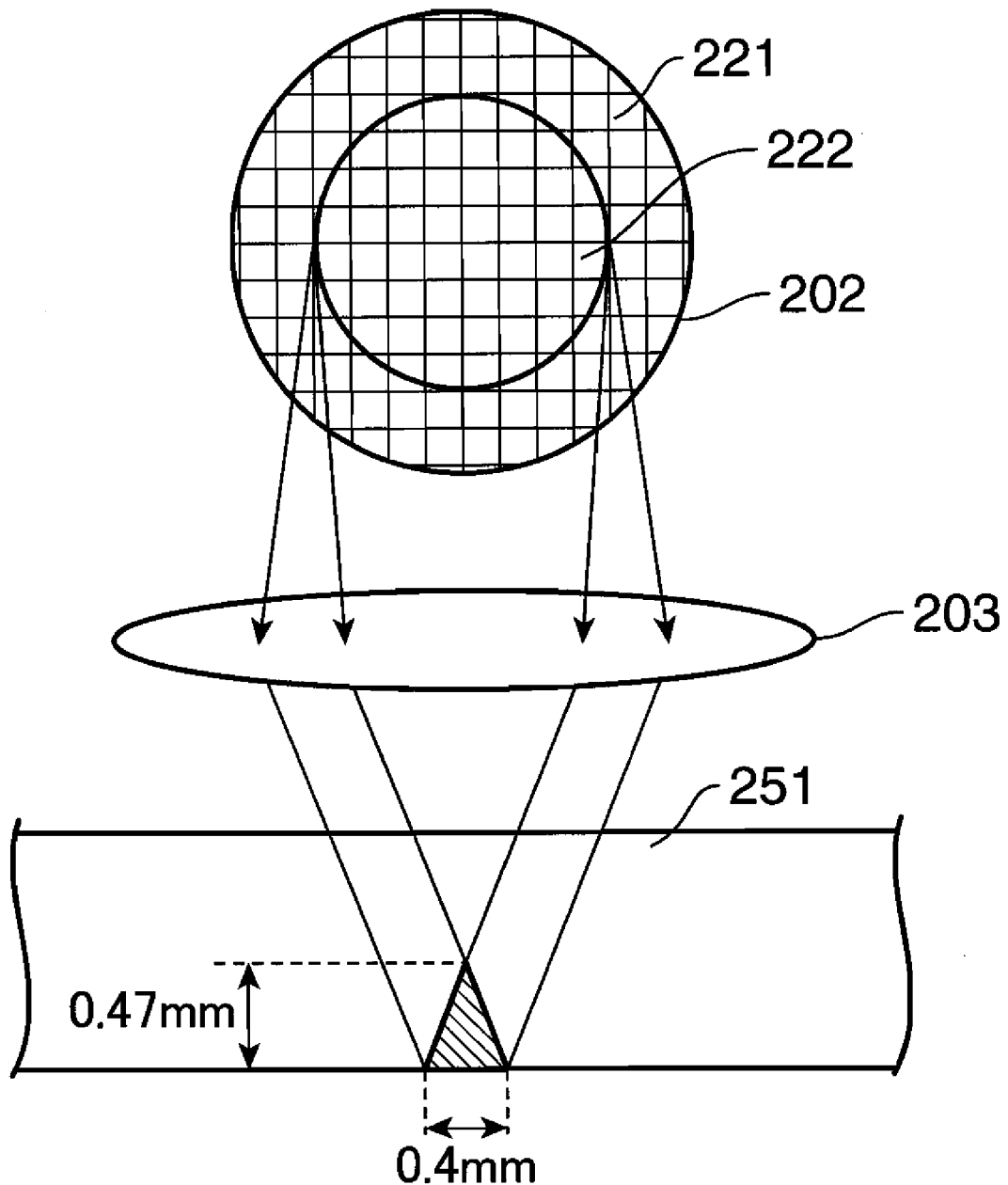
FIG. 10 is a view showing a state of a light beam inside of a hologram disk in the conventional hologram recording/reproducing apparatus.

In the holographic optical-information recording/reproducing apparatus according to this embodiment, the width d1 of each pixel of the reference light area 21 is smaller than the width d2 of each pixel of the signal light area 22. Thus, the divergence angle of reference light emitted from the reference light area 21 is wider than the divergence angle of signal light emitted from the signal light area 22. Thereby, the beam size inside of the hologram recording material 51 becomes larger. The slashed part of FIG. 2 is an area in which reference light beams interfere with each other to form a speckle pattern. It is thicker and wider than the corresponding part of the hologram recording/reproducing apparatus of FIG. 10 according to the prior art. Specifically, the area of an interference fringe is a slashed triangle with a lateral width of 0.8 mm and a thickness-direction height of 1.0 mm. These numeric values indicating the size of the interference area given in FIG. 2 are, similarly to FIG. 10, values when the light-source wavelength is 400 nm, the numerical aperture of the Fourier transform lens 3 is 0.6.

Therefore, the holographic optical-information recording/reproducing apparatus according to this embodiment is capable of enlarging the interference volume of reference light. This makes it possible to reduce the quantity of signal light significantly due to a slight shift in the reference-light position and record and/or reproduce many holograms closer to each other. This helps increase the recording capacity of the hologram disk 5.

Figure 3:
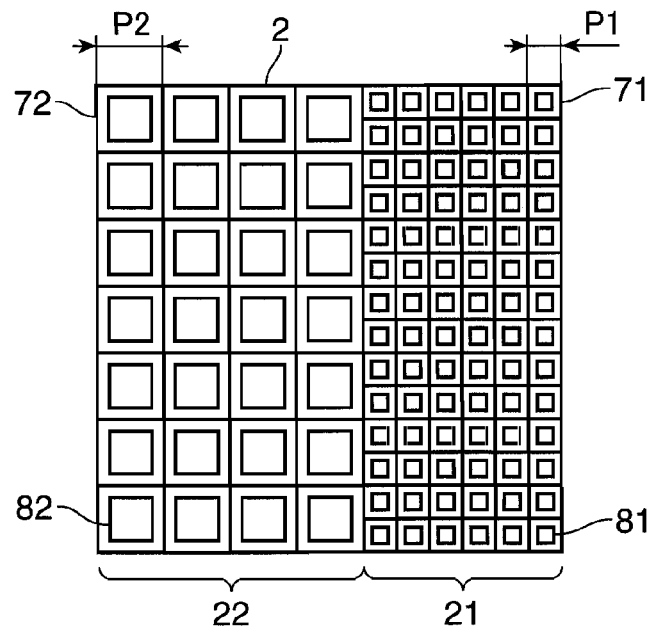
FIG. 3 is a schematic plan view showing the configuration of an example of a spatial light modulator according to the first embodiment of the present invention.
Figure 4:
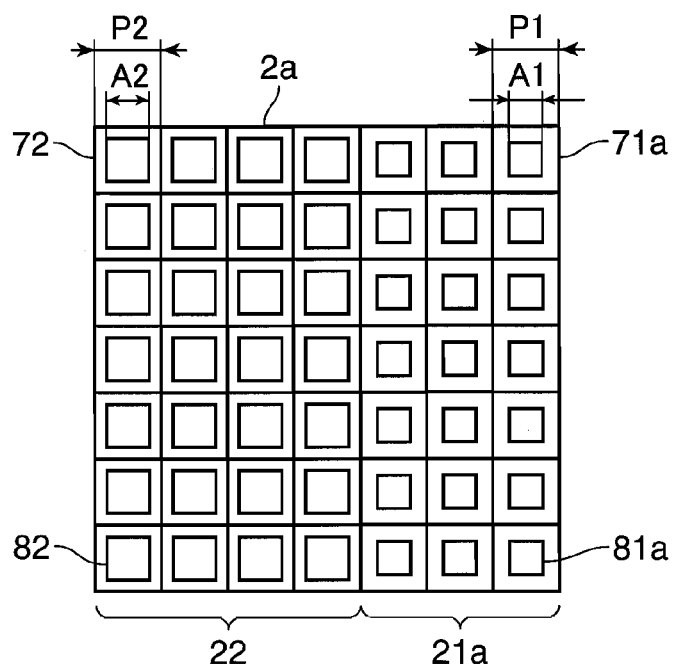
FIG. 4 is a schematic plan view showing the configuration of another example of the spatial light modulator according to the first embodiment of the present invention.

Herein, the size of each pixel of the spatial light modulator 2 may also be made smaller, as shown in FIG. 3, by shortening the pitch of each pixel, or as shown in FIG. 4, by making only the aperture size of each pixel smaller. In FIG. 3 and FIG. 4, as can be easily understood, the boundary between the reference light area 21 and the signal light area 22 is linearly shown. However, if the signal light area 22 is circular and the reference light area 21 is shaped like a ring, the boundary between the reference light area 21 and the signal light area 22 is a circle. Hence, a stepwise boundary which approximates this circle partitions it into the reference light area 21 and the signal light area 22. Along the boundary part between the reference light area 21 and the signal light area 22, a black stripe (a black belt area) for cutting light off may also be suitably provided.

In the spatial light modulator 2 shown in FIG. 3, a pixel pitch P1 of the reference light area 21 is set to half of a pixel pitch P2 of the signal light area 22. Each pixel 71 of the reference light area 21 is smaller than each pixel 72 of the signal light area 22. The width (longitudinal length and lateral length) of an aperture 81 of each pixel 71 of the reference light area 21 is set to half the width (longitudinal length and lateral length) of an aperture 82 of each pixel 72 of the signal light area 22.

As shown in FIG. 3, if the pitch of each pixel is simultaneously shortened, the light utilization efficiency (average light transmittance) of the reference light area 21 can be prevented from lowering. Incidentally, the ratio of the pixel pitch P1 of the reference light area 21 to the pixel pitch P2 of the signal light area 22 is not limited especially to 1:2 described above. It may also be a value other than this, as long as the pixel pitch P1 is shorter than the pixel pitch P2. For example, it is preferable that the length of each pixel of the reference light area 21 be one-nth (n is an integer) the length of each pixel of the signal light area 22. In this case, each pixel of the reference light area 21 and the signal light area 22 can be manufactured with high precision.

In a spatial light modulator 2a shown in FIG. 4, the pixel pitch P1 of a reference light area 21a is equal to the pixel pitch P2 of the signal light area 22. Thus, the pixel size of the reference light area 21a is equivalent to the pixel size of the signal light area 22. However, the size (aperture width A1×aperture width A1: longitudinal length×lateral length) of an aperture 81a of each pixel 71a of the reference light area 21a is set to half the size (aperture width A2×aperture width A2: longitudinal length×lateral length) of the aperture 82 of each pixel 72 of the signal light area 22.

As shown in FIG. 4, if only the aperture size of each pixel is smaller, the spatial light modulator 2a can be more simply configured. This is advantageous in that its cost can be restrained from rising. Incidentally, the ratio of the aperture size of each pixel of the reference light area 21 to the aperture size of each pixel of the signal light area 22 is not limited especially to 1:2 described above. It may also be a value other than this, so long as the aperture size of the reference light area 21 is smaller than the aperture size of the signal light area 22.

In addition, in the examples of FIG. 3 and FIG. 4, each aperture is a rectangle (square), but it is not limited especially to a rectangle, as long as the size of each aperture or the pitch of each pixel satisfies the above described relationship. For example, a circular aperture, a polygonal aperture other than a quadrilateral one, an aperture having an arbitrary curve, or the like can also be adopted.

Second Embodiment

Figure 5:
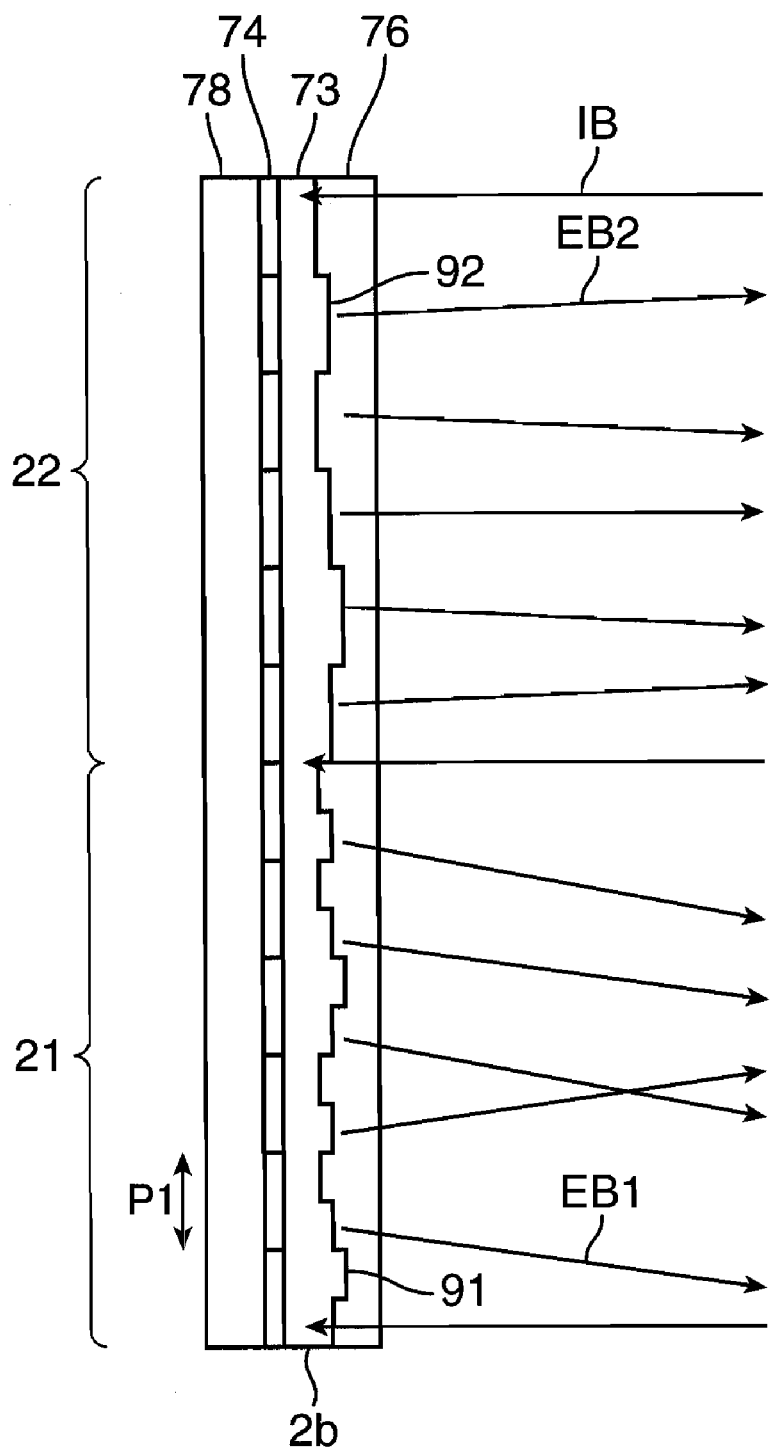
FIG. 5 is a schematic sectional view showing the configuration of an example of a spatial light modulator used in a holographic optical-information recording/reproducing apparatus according to a second embodiment of the present invention.

A holographic optical-information recording/reproducing apparatus according to a second embodiment of the present invention is provided with a spatial light modulator 2b in schematic sectional view of FIG. 5. Otherwise, it is the same as the holographic optical-information recording/reproducing apparatus of FIG. 1, and thus, its identical part is not shown and described.

FIG. 5 shows the sectional structure of a part which includes both the signal light area 22 and the reference light area 21 in the spatial light modulator 2b used in the holographic optical-information recording/reproducing apparatus according to the second embodiment. In the same way as the first embodiment, an incident beam IB from the laser light source 1 is incident upon the spatial light modulator 2b of FIG. 5. The spatial light modulator 2b includes a silicon substrate 78, a glass substrate 73, and a liquid-crystal layer 74 which is sandwiched between and sealed with the silicon substrate 78 and the glass substrate 73. On the silicon substrate 78, a light reflection film and a liquid-crystal drive circuit are integrated at its contact part with the liquid-crystal layer 74, but they are not shown in FIG. 5 for the sake of simplification. The glass substrate 73 is formed, on its opposite side to the liquid-crystal layer 74, with rectangular uneven surfaces 91 and 92 corresponding to the liquid-crystal pixels. Further, a transparent resin layer 76 is attached to these uneven surfaces 91 and 92.

Herein, the reference light area 21 and the signal light area 22 of the spatial light modulator 2b has the same pixel pitch P1. The uneven surface 92 of the signal light area 22 is formed with an uneven pattern in such a way that each pixel of the signal light area 22 of the spatial light modulator 2b corresponds to one pixel area (unit area of the uneven pattern) of the uneven surface 92 of the signal light area 22. On the other hand, the uneven surface 91 of the reference light area 21 is formed with an uneven pattern in such a way that each pixel of the reference light area 21 of the spatial light modulator 2b corresponds to a plurality of pixel areas (unit areas of the uneven pattern) of the uneven surface 91 of the reference light area 21.

The uneven surface 91 of the reference light area 21 and the uneven surface 92 of the signal light area 22 is formed in such a way that the uneven pattern (width and/or height of each concave and convex) of the uneven surface 91 of the reference light area 21 becomes smaller than the uneven pattern (width and/or height of each concave and convex) of the uneven surface 92 of the signal light area 22. Specifically, the concave-and-convex width of the uneven surface 91 of the reference light area 21 is set to half the pixel pitch P1 of the reference light area 21, in other words, half the concave-and-convex width of the uneven surface 92 of the signal light area 22.

The glass substrate 73 has a refractive index different from the transparent resin layer 76, and thus, a beam of light undergoes a different phase shift when passing through each different part in height of the uneven surfaces 91 and 92. This disturbs the phase wave-front of the beam of light which has passed through the boundary surface (the uneven surfaces 91 and 92) between the glass substrate 73 and the transparent resin layer 76. Thereby, the glass substrate 73 and the transparent resin layer 76 work as a diffuser.

In this embodiment, this diffusion function allows the uneven pattern of the reference light area 21 to become smaller. Specifically, it allows the uneven pattern (width and/or height of each concave and convex) of the uneven surface 91 of the reference light area 21 to become smaller than the uneven pattern (width and/or height of each concave and convex) of the uneven surface 92 of the signal light area 22. This prompts a beam of light EB1 passing through the uneven surface 91 of the reference light area 21 to diffuse more widely than a beam of light EB2 passing through the uneven surface 92 of the signal light area 22.

As a result, in this embodiment as well, the divergence angle of the reference light EB1 emitted from the reference light area 21 becomes wider the divergence angle of the signal light EB2 emitted from the signal light area 22. This makes it possible to obtain the same advantages as those according to the first embodiment.

In FIG. 5, the glass substrate 73 for sealing the liquid-crystal layer 74 is also used as the diffusion plate having the function of a diffuser. However, a plane substrate for sealing the liquid-crystal layer 74 may be used as the glass substrate 73, and another diffusion plate can be arranged adjacent to the spatial light modulator 2b. This diffusion plate is formed with an uneven pattern similar to the above in such away that the diffusion angle of the diffusion plate facing the reference light area 21 becomes wider than the diffusion angle of the diffusion plate facing the signal light area 22. In addition, the example is given in which the difference in refractive index is used between the glass substrate 73 and the transparent resin layer 76. However, such materials are not limited to specific materials, as long as they are transparent and have a mutually different refractive index. Besides, in FIG. 5, the uneven shape is made on the boundary surface between the two kinds of substrates (the glass substrate 73 and the transparent resin layer 76). However, the difference in refractive index between the glass substrate 73 and air may also be used without the transparent resin layer 76. In addition, the diffusion plate is not limited to the glass substrate. It may also be a commonly used transparent substrate. The above are also applied to the spatial light modulators described later.

Furthermore, in FIG. 5, the uneven surfaces 91 and 92 of the glass substrate 73 and the transparent resin layer 76 which function as the diffusion plate are divided into pixels. The diffusion plate has steps each of which is different for each pixel. The same advantage can also be realized, as shown in FIG. 6, in a diffusion plate shaped like a smooth surface.

Figure 6:
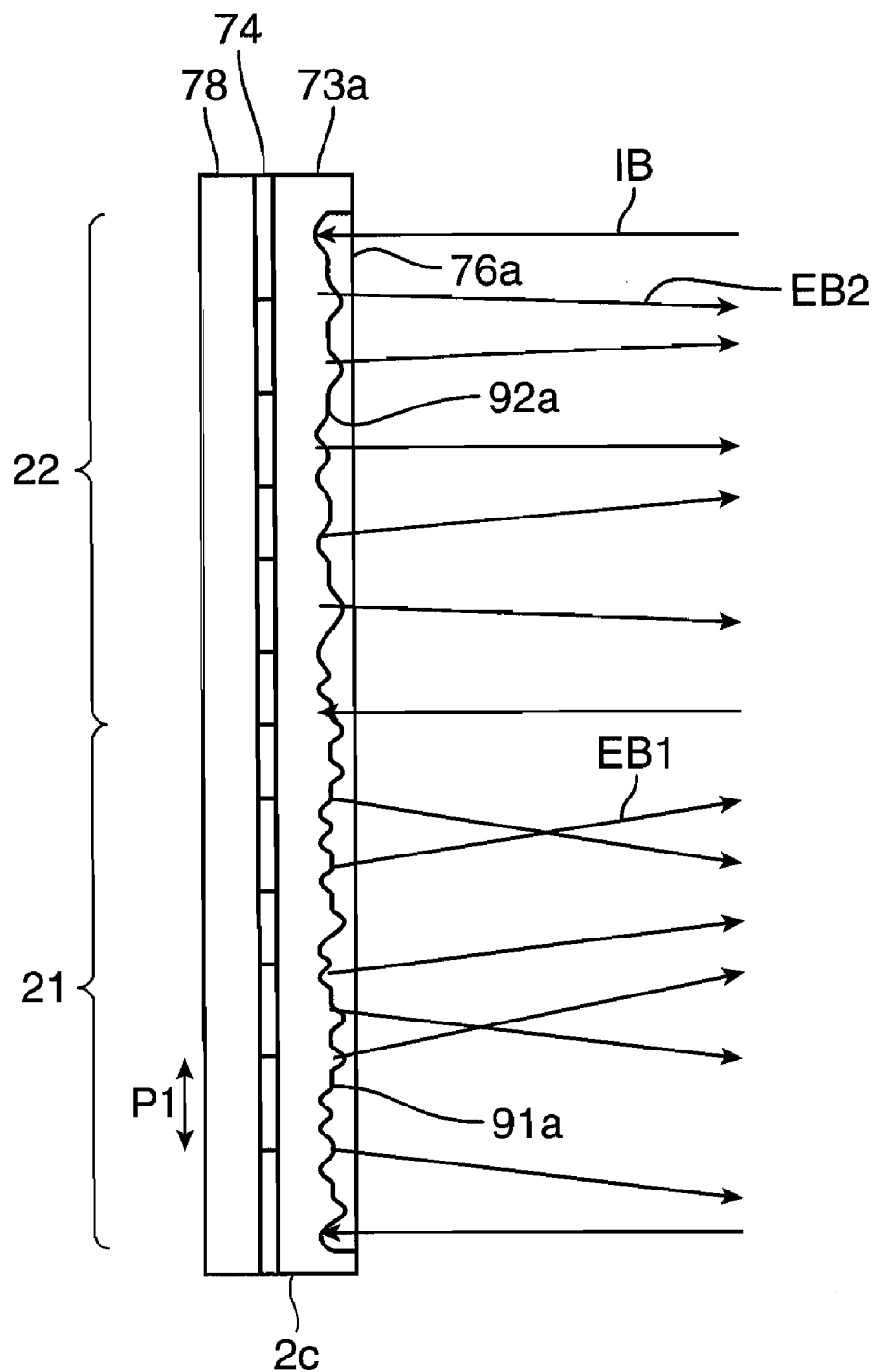
FIG. 6 is a schematic sectional view showing the configuration of another example of the spatial light modulator according to the second embodiment of the present invention.

FIG. 6 shows the sectional structure of a part which includes both the signal light area 22 and the reference light area 21 in another spatial light modulator 2c used in the holographic optical-information recording/reproducing apparatus according to the second embodiment. The spatial light modulator 2c of FIG. 6 includes the silicon substrate 78, a glass substrate 73a, and the liquid-crystal layer 74 sandwiched between those. On the silicon substrate 78, a light reflection film and a liquid-crystal drive circuit are integrated at its contact part with the liquid-crystal layer 74, but for the sake of simplification, they are not shown in FIG. 6, either. The glass substrate 73a is formed, on its opposite side to the liquid-crystal layer 74, with uneven surfaces 91a and 92a having a continuous smooth curve in section. Further, a transparent resin layer 76a is attached to these uneven surfaces 91a and 92a.

Herein, the reference light area 21 and the signal light area 22 of the spatial light modulator 2c has the same pixel pitch P1. However, the uneven surface 91a of the reference light area 21 and the uneven surface 92a of the signal light area 22 are formed in such a way that the granularity of the uneven surface 91a of the reference light area 21 is smaller than the granularity of the uneven surface 92a of the signal light area 22. In other words, they are formed in such a way that the smooth uneven pattern (cycle and/or amplitude of each concave and convex of the waveform) of the uneven surface 91a of the reference light area 21 is smaller than the smooth uneven pattern (cycle and/or amplitude of each concave and convex of the waveform) of the uneven surface 92a of the signal light area 22. Specifically, the concave-and-convex basic cycle of the uneven surface 91a of the reference light area 21 is set to half the concave-and-convex basic cycle of the uneven surface 92a of the signal light area 22.

The glass substrate 73a has a refractive index different from the transparent resin layer 76a, and thus, a beam of light undergoes a different phase shift when passing through each different part in height of the uneven surfaces 91a and 92a. This disturbs the phase wave-front of the beam of light which has passed through the boundary surface (the uneven surfaces 91a and 92a) between the glass substrate 73a and the transparent resin layer 76a. Thereby, the glass substrate 73a and the transparent resin layer 76a work as a diffuser.

Using this diffusion function, in this embodiment, as shown in FIG. 6, the smooth unevenness of the reference light area 21 is different in granularity from that of the signal light area 22. The smooth uneven granularity of the uneven surface 91a of the reference light area 21 is set to be finer than the smooth uneven granularity of the uneven surface 92a of the signal light area 22. In this case, in the uneven surface 91a of the reference light area 21, finer concaves and convexes are formed in the in-plane direction, so that a beam of light can be diffused at a wider angle.

In other words, the smooth uneven pattern (cycle and/or amplitude of each concave and convex of the waveform) of the uneven surface 91a of the reference light area 21 becomes finer than the smooth uneven pattern (cycle and/or amplitude of each concave and convex of the waveform) of the uneven surface 92a of the signal light area 22. This allows the light EB1 passing through the uneven surface 91a of the reference light area 21 to diffuse more widely than the light EB2 passing through the uneven surface 92a of the signal light area 22.

As a result, likewise in the spatial light modulator 2c of FIG. 6, the divergence angle of the reference light EB1 emitted from the reference light area 21 becomes wider than the divergence angle of the signal light EB2 emitted from the signal light area 22. This makes it possible to obtain the same advantages as those according to the first embodiment. Besides, in the spatial light modulator 2c of FIG. 6, its phase shift continues without a discontinuity. This helps decrease the quantity of a light component to be diffused at a wider angle, thus enhancing the light utilization efficiency.

Furthermore, the configuration of the diffusion plate is not limited especially to the above described example. A diffusion plate may also be used which has an uneven shape with an equivalent granularity in the in-plane direction and has a deeper uneven shape in the reference light area 21. In this case alike, each part having such an uneven shape on the surface inclines more sharply, so that a beam of light can be diffused, in the same way as the above, at a wider angle in the reference light area 21 than in the signal light area 22.

Moreover, in terms of the glass substrate 73a and the transparent resin layer 76a which function as the diffusion plate of the spatial light modulator 2c shown in FIG. 6, many diffusion plates having one and the same surface shape are manufactured with precision. This requires the measurement of a complex surface shape and the management of a manufacturing process. In contrast, in terms of the glass substrate 73 and the transparent resin layer 76 which function as the diffusion plate divided into each pixel in the spatial light modulator 2b shown in FIG. 5, if the height of each step is managed, diffusion plates having the same surface shape can be mass-produced with high precision.

Third Embodiment

Figure 7:
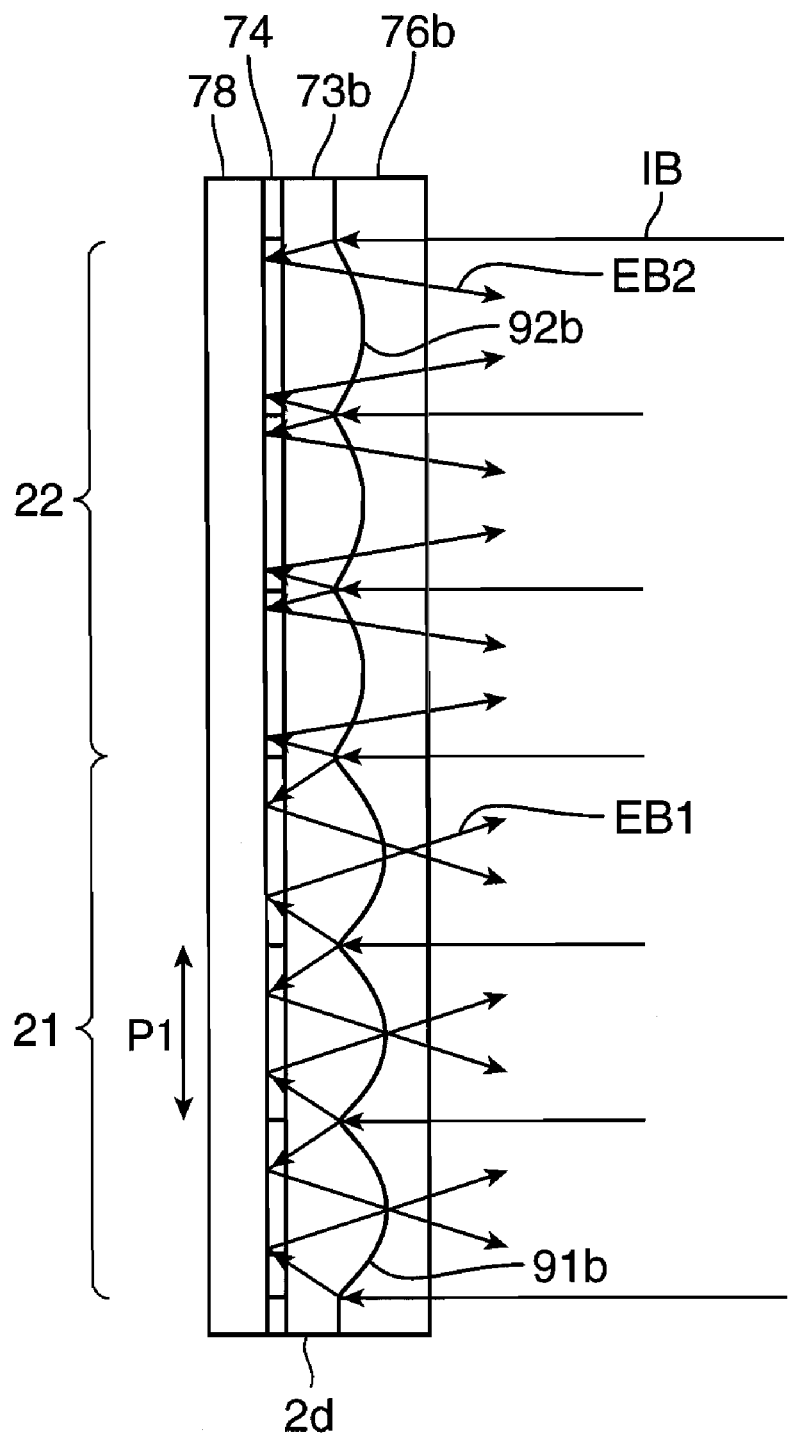
FIG. 7 is a schematic sectional view showing the configuration of an example of a spatial light modulator used in a holographic optical-information recording/reproducing apparatus according to a third embodiment of the present invention.

A holographic optical-information recording/reproducing apparatus according to a third embodiment of the present invention is provided with a spatial light modulator 2d in schematic sectional view of FIG. 7. Otherwise, it is the same as the holographic optical-information recording/reproducing apparatus of FIG. 1, and thus, its identical part is not shown and described.

FIG. 7 shows the sectional structure of a part which includes both the signal light area 22 and the reference light area 21 in the spatial light modulator 2d used in the holographic optical-information recording/reproducing apparatus according to the third embodiment. The spatial light modulator 2d shown in FIG. 7 includes the silicon substrate 78, a glass substrate 73b, and the liquid-crystal layer 74 sandwiched between those. On the silicon substrate 78, alight reflection film and a liquid-crystal drive circuit are integrated at its contact part with the liquid-crystal layer 74, but they are not shown in FIG. 7 for the sake of simplification. The glass substrate 73b is formed on its opposite side to the liquid-crystal layer 74 with lens surfaces 91 and 92. Each convex curved-surface part of these lens surfaces 91 and 92 is shaped like a lens and corresponds to one pixel. Further, a transparent resin layer 76b is attached to the lens surfaces 91b and 92b.

Herein, the glass substrate 73b has a refractive index different from the transparent resin layer 76b, and thus, the lens surfaces 91b and 92b of the glass substrate 73b and the transparent resin layer 76b work as a micro-lens array for collecting a beam of light incident upon each pixel. Each convex curved-surface part of the lens surfaces 91 and 92 functions as an element lens of the micro-lens array. The reference light area 21 and the signal light area 22 of the spatial light modulator 2d has the same pixel pitch P1. However, the lens surface 91b of the reference light area 21 and the lens surface 92b of the signal light area 22 are formed with convex curved-surface parts in such a way that the focal length of each element lens formed by the lens surface 91b of the reference light area 21 is shorter than the focal length of each element lens formed by the lens surface 92b of the signal light area 22. Specifically, the focal length of each convex curved-surface part of the lens surface 91b of the reference light area 21 is set to half the focal length of each convex curved-surface part of the lens surface 92b of the signal light area 22.

As described above, in this embodiment, the focal length of each element lens formed by the lens surface 91b of the reference light area 21 is shorter than the focal length of each element lens formed by the lens surface 92b of the signal light area 22. This allows the light EB1 passing through the lens surface 91b of the reference light area 21 to diffuse more widely than the light EB2 passing through the lens surface 92b of the signal light area 22.

As a result, likewise in this embodiment, the divergence angle of the reference light EB1 emitted from the reference light area 21 becomes wider than the divergence angle of the signal light EB2 emitted from the signal light area 22. This makes it possible to obtain the same advantages as those according to the first embodiment. Besides, in the spatial light modulator 2d shown in FIG. 7, the quantity of light to be cut off between each pixel of the spatial light modulator 2d can be reduced, thus enhancing the light utilization efficiency.

In FIG. 7, the glass substrate 73b for sealing the liquid-crystal layer 74 functions as the micro-lens array as well. However, a plane substrate for sealing the liquid-crystal layer 74 may be used as the glass substrate 73b, and another micro-lens array can be adjacently arranged in such a way that the focal length of each element lens of the micro-lens array facing the reference light area 21 will not be shorter than the focal length of each element lens of the micro-lens array facing the signal light area 22. In addition, the example is given in which the difference in refractive index is used between the glass substrate 73b and the transparent resin layer 76. However, such materials are not limited to specific materials, as long as they are transparent and have a mutually different refractive index. Besides, in FIG. 7, the lens shape is made on the boundary surface between the two kinds of substrates (the glass substrate 73b and the transparent resin layer 76b). However, the difference in refractive index between the glass substrate 73b and air may also be used without the transparent resin layer 76b.

Fourth Embodiment

Figure 8:
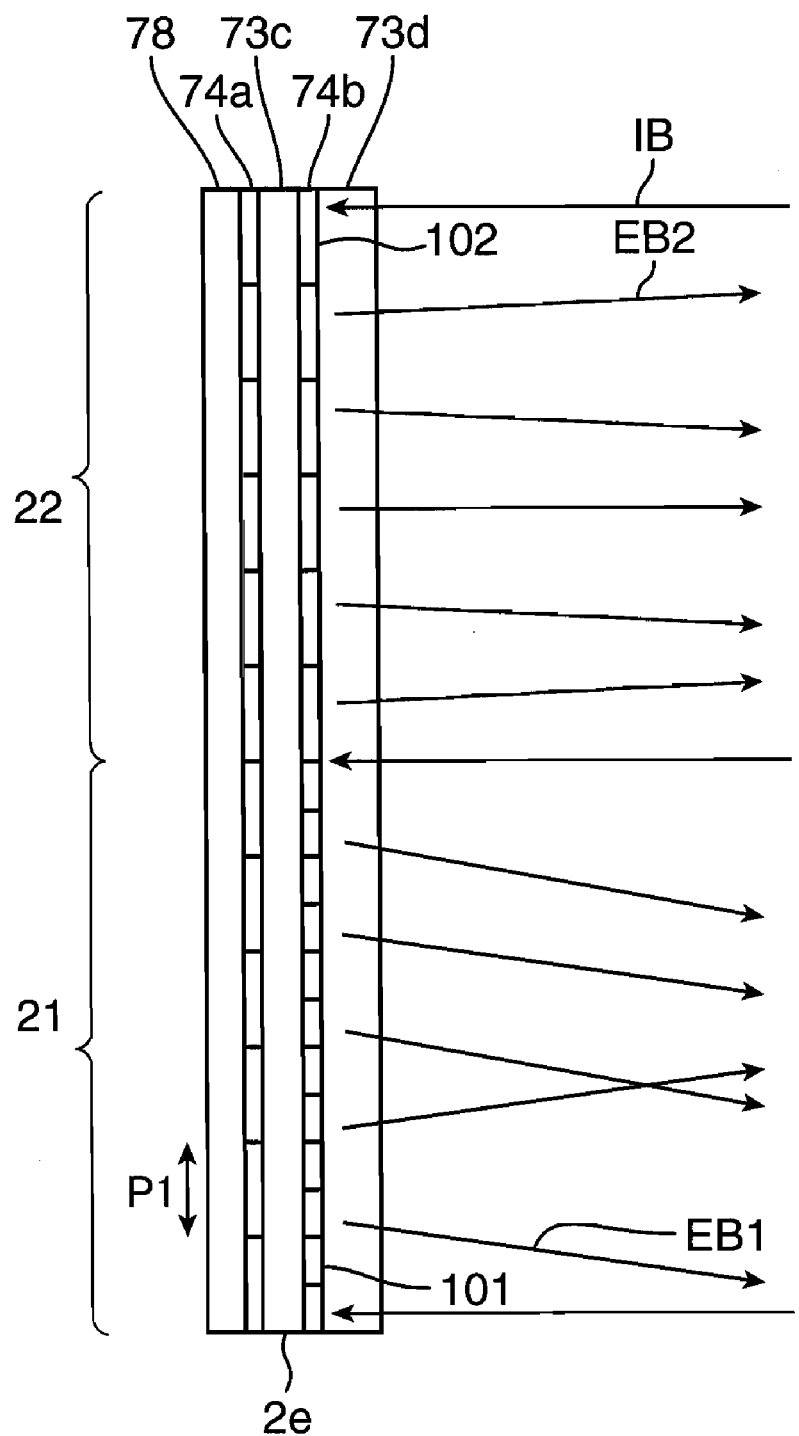
FIG. 8 is a schematic sectional view showing the configuration of an example of a spatial light modulator used in a holographic optical-information recording/reproducing apparatus according to a fourth embodiment of the present invention.
Figure 9:
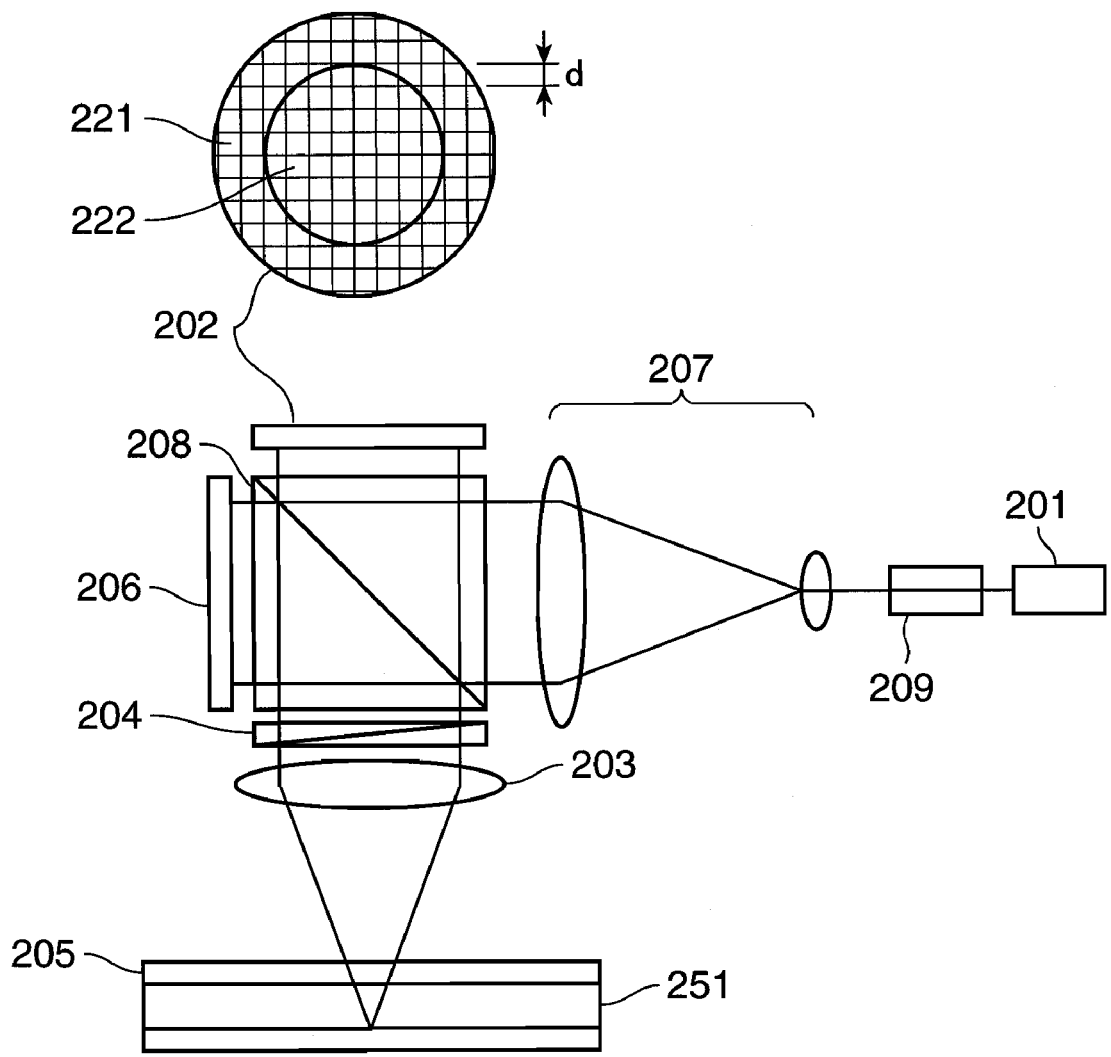
FIG. 9 is a schematic view showing the configuration of a conventional hologram recording/reproducing apparatus.

A holographic optical-information recording/reproducing apparatus according to a fourth embodiment of the present invention is provided with a spatial light modulator 2e in schematic sectional view of FIG. 8. Otherwise, it is the same as the holographic optical-information recording/reproducing apparatus of FIG. 1, and thus, its identical part is not shown and described.

FIG. 8 shows the sectional structure of a part which includes both the signal light area 22 and the reference light area 21 in the spatial light modulator 2e used in the holographic optical-information recording/reproducing apparatus according to the fourth embodiment. The spatial light modulator 2e shown in FIG. 8 includes the silicon substrate 78, a plane glass substrate 73c, and a first liquid-crystal layer 74a which is sandwiched between and sealed with the silicon substrate 78 and the glass substrate 73c. It also includes a plane glass substrate 73d, and a second liquid-crystal layer 74b which is sandwiched between and sealed with the glass substrate 73c and the glass substrate 73d.

The spatial light modulator 2b shown in FIG. 5 is designed to modulate the intensity of light using the liquid-crystal layer 74 and modulate the phase of light on the boundary surface between the uneven glass substrate 73 and the transparent resin layer 76. In the spatial light modulator 2e according to this embodiment, the first liquid-crystal layer 74a modulates the intensity of light in the same way as the liquid-crystal layer 74 of FIG. 5. The second liquid-crystal layer 74b has a configuration called a homogeneous orientation in which the upper and lower surfaces of a liquid crystal layer are oriented in parallel with each other. Thereby, it modulates only the phase of light in accordance with a voltage applied from a control circuit (not shown).

Herein, the reference light area 21 and the signal light area 22 of the first liquid-crystal layer 74a in the spatial light modulator 2e has the same pixel pitch P1. However, the second liquid-crystal layer 74b is divided into a reference-light-area liquid-crystal layer 101 located in the reference light area 21 and a signal-light-area liquid-crystal layer 102 located in the signal light area 22. The second liquid-crystal layer 74b modulates only the phase of light in accordance with the applied voltage in such a way that the variation in the phase of reference light at the reference-light-area liquid-crystal layer 101 becomes larger than the variation in the phase of signal light at the signal-light-area liquid-crystal layer 102. This allows the light EB1 passing through the reference-light-area liquid-crystal layer 101 to diffuse more widely than the light EB2 passing through the signal-light-area liquid-crystal layer 102.

As a result, in this embodiment alike, the divergence angle of the reference light EB1 emitted from the reference light area 21 becomes wider than the divergence angle of the signal light EB2 emitted from the signal light area 22. This makes it possible to obtain the same advantages as in the case where the diffusion plate is used in FIG. 5.

The configuration of the spatial light modulator 2e of FIG. 8 has the following advantage, different from that of the spatial light modulator 2b of FIG. 5. In the spatial light modulator 2b of FIG. 5, an error may be made in the depth (height) of each concave and convex of the glass substrate 73 when it is manufactured. Or, an error may be made in the phase modulation depth when the environmental temperature varies. Such an error could degrade the S/N ratio of a reproduction signal. In contrast, in the spatial light modulator 2e of FIG. 8, the modulated phase can be adjusted based on the applied voltage. This helps compensate for those errors by adjusting the applied voltage to an appropriate value in response to a variation in the environmental temperature or the like. Consequently, this embodiment is capable of obtaining an optimum phase variation constantly to reproduce a signal stably at a high S/N ratio.

In all the above embodiments, a reflection-type spatial light modulator is employed. However, the hologram recording/reproducing apparatus according to the present invention can also be applied to the case of a transmission-type spatial light modulator including transparent substrates and a liquid-crystal layer sandwiched between them.

Furthermore, in all the above embodiments, a signal light area lies inside of a spatial light modulator and a reference light area lies in its peripheral part. However, regardless of how to divide it into each area, the hologram recording/reproducing apparatus according to the present invention is effective. For example, a signal light area and a reference light area may also be formed by dividing it into two right and left areas. In addition, both a reference light area and a signal light area lie on a single spatial light modulator. However, the hologram recording/reproducing apparatus according to the present invention is effective even if separate spatial light modulators are used for each of signal light and reference light.

Moreover, in all the above embodiments, a reference light area is provided on a spatial light modulator. However, a spatial light modulator, for example, with a fixed pattern like a photo-mask may be used as a reference light area. This is because there is no need to change the pattern of a beam of reference light for each hologram.

On the basis of each embodiment described so far, the present invention is summarized as follows. The hologram recording/reproducing apparatus according to the present invention includes: a coherent light source; a spatial light modulator which spatially modulates light from the coherent light source; a Fourier transform lens which concentrates light modulated by the spatial light modulator upon a hologram medium; and a two-dimensional light-receiving element array which receives light from the hologram medium, in which: the spatial light modulator is divided into a reference light area and a signal light area; and the divergence angle of reference light emitted from the reference light area is wider than the divergence angle of signal light emitted from the signal light area.

In this hologram recording/reproducing apparatus, the divergence angle of reference light emitted from the reference light area is wider than the divergence angle of signal light emitted from the signal light area. Therefore, the interference area of reference light becomes larger, thus helping reduce the quantity of signal light significantly because of a slight shift in the reference-light position and record and/or reproduce many holograms closer to each other. As a result, it is capable of enhancing the quality of a reproduction signal, as well as recording a large number of holograms to increase a recording capacity.

It is preferable that: the reference light area and the signal light area be each divided into a plurality of pixels; and the aperture of each pixel of the reference light area be smaller than the aperture of each pixel of the signal light area.

In this case, the aperture of each pixel of the reference light area is smaller than the aperture of each pixel of the signal light area. Therefore, using a simple configuration, the divergence angle of reference light emitted from the reference light area can be made wider than the divergence angle of signal light emitted from the signal light area.

It is preferable that each pixel of the reference light area be smaller than each pixel of the signal light area.

In this case, each pixel of the reference light area is smaller than each pixel of the signal light area. Therefore, with the light utilization efficiency maintained in the reference light area, the divergence angle of reference light emitted from the reference light area can be made wider than the divergence angle of signal light emitted from the signal light area.

It is preferable that the length of each pixel of the reference light area be one-nth (n is an integer) the length of each pixel of the signal light area.

In this case, the length of each pixel of the reference light area becomes one-nth (n is an integer) the length of each pixel of the signal light area. Therefore, each pixel of the reference light area and each pixel of the signal light area can be easily created. At the same time, the divergence angle of reference light emitted from the reference light area can be made wider than the divergence angle of signal light emitted from the signal light area.

It is preferable that: the above described hologram recording/reproducing apparatus further comprise a diffusion plate which is adjacent to the spatial light modulator; and the diffusion angle of the diffusion plate opposite to the reference light area be wider than the diffusion angle of the diffusion plate opposite to the signal light area.

In this case, the diffusion angle of the diffusion plate opposite to the reference light area is wider than the diffusion angle of the diffusion plate opposite to the signal light area. Therefore, using a simple configuration, the divergence angle of reference light emitted from the reference light area can be made wider than the divergence angle of signal light emitted from the signal light area.

It is preferable that: the diffusion plate be divided into a plurality of pixel areas each of which gives a different phase shift to light passing through the pixel areas; and each pixel of the spatial light modulator correspond to one pixel area of the diffusion plate in the signal light area, and each pixel of the spatial light modulator correspond to a plurality of pixel areas of the diffusion plate in the reference light area.

In this case, each pixel of the spatial light modulator corresponds to one pixel area of the diffusion plate in the signal light area, and each pixel of the spatial light modulator corresponds to a plurality of pixel areas of the diffusion plate in the reference light area. Therefore, the diffusion plate in which the diffusion angle of the reference light area is wider than the diffusion angle of the signal light area can be easily created.

It is preferable that: the spatial light modulator include at least one transparent substrate for sealing a liquid-crystal layer; the transparent substrate have an uneven surface which functions as the diffusion plate; and the diffusion angle of the uneven surface opposite to the reference light area be wider than the diffusion angle of the uneven surface opposite to the signal light area.

In this case, the transparent substrate functions as the diffusion plate, so that there is no need to provide a separate diffusion plate, thus helping simplify the configuration of the apparatus.

It is preferable that: the uneven surface include a rectangular uneven surface; and the unevenness width and/or height of the uneven surface opposite to the reference light area be smaller than the unevenness width and/or height of the uneven surface opposite to the signal light area.

In this case, the transparent substrate which also functions as the diffusion plate can be easily created.

It is preferable that: the uneven surface include a smooth uneven surface; and the granularity of the uneven surface opposite to the reference light area be smaller than the granularity of the uneven surface opposite to the signal light area.

In this case, the phase shift continues without a discontinuity. This helps decrease the quantity of a light component to be diffused at a wider angle, thus enhancing the light utilization efficiency.

It is preferable that: the reference light area and the signal light area be each divided into a plurality of pixels; the above described hologram recording/reproducing apparatus further comprise a micro-lens array which includes a plurality of element lenses corresponding to the plurality of pixels and is adjacent to the spatial light modulator; and the focal length of each element lens of the micro-lens array opposite to the reference light area be shorter than the focal length of each element lens of the micro-lens array opposite to the signal light area.

In this case, the focal length of each element lens of the micro-lens array opposite to the reference light area is shorter than the focal length of each element lens of the micro-lens array opposite to the signal light area. Therefore, the divergence angle of reference light emitted from the reference light area can be made wider than the divergence angle of signal light emitted from the signal light area. Simultaneously, the quantity of light to be cut off between each pixel of the spatial light modulator can be reduced, thus enhancing the light utilization efficiency.

It is preferable that: the spatial light modulator include at least one transparent substrate for sealing a liquid-crystal layer; the transparent substrate have a convex curved-surface part which functions as an element lens of the micro-lens array; and the focal length of the convex curved-surface part opposite to the reference light area be shorter than the focal length of the convex curved-surface part opposite to the signal light area.

In this case, the transparent substrate also functions as the micro-lens array, so that there is no need to provide a separate micro-lens array, thus helping simplify the configuration of the apparatus.

It is preferable that: the spatial light modulator include a first liquid-crystal layer which modulates the intensity of light and a second liquid-crystal layer which modulates the phase of light; the second liquid-crystal layer be divided into a reference-light-area liquid-crystal layer located in the reference light area and a signal-light-area liquid-crystal layer located in the signal light area; and a variation in the phase of light at the reference-light-area liquid-crystal layer be larger than a variation in the phase of light at the signal-light-area liquid-crystal layer.

In this case, the variation in the phase of light at the reference-light-area liquid-crystal layer in the second liquid-crystal layer is larger than the variation in the phase of light at the signal-light-area liquid-crystal layer. Therefore, the divergence angle of reference light emitted from the reference light area can be made wider than the divergence angle of signal light emitted from the signal light area. Besides, the modulated phase can be adjusted based on an applied voltage. This makes it possible to obtain a suitable phase variation in response to a variation in environmental temperature or the like, and thus, reproduce a signal stably at a high S/N ratio.

It is preferable that the spatial light modulator hold a fixed modulation pattern in the reference light area.

In this case, using the reference light applied in the fixed modulation pattern, a large number of holograms can be stably recorded and/or reproduced.

The hologram recording/reproducing apparatus according to the present invention is capable of enhancing the quality of a reproduction signal, as well as recording a large number of holograms to increase a recording capacity. It is useful for an external storage in a computer, an audio-visual information storage or the like.

This application is based on Japanese patent application serial No. 2007-068396, filed in Japan Patent Office on Mar. 16, 2007, the contents of which are hereby incorporated by reference.

Although the present invention has been fully described by way of example with reference to the accompanied drawings, it is to be understood that various changes and modifications will be apparent to those skilled in the art. Therefore, unless such changes and modifications depart from the scope of the present invention hereinafter defined, they should be construed as being included therein.

What is claimed is:

1. A hologram recording/reproducing apparatus, comprising:
    a coherent light source;
    a spatial light modulator which spatially modulates light from the coherent light source;
    a Fourier transform lens which concentrates light modulated by the spatial light modulator upon a hologram medium; and
    a two-dimensional light-receiving element array which receives light from the hologram medium, wherein:
    the spatial light modulator is divided into a reference light area and a signal light area;
    the divergence angle of reference light emitted from the reference light area is wider than the divergence angle of signal light emitted from the signal light area;
    the reference light area and the signal light area are each divided into a plurality of pixels, each pixel having an aperture; and
    the aperture of each pixel of the reference light area is smaller than the aperture of each pixel of the signal light area.

2. The hologram recording/reproducing apparatus according to claim 1, wherein each pixel of the reference light area is smaller than each pixel of the signal light area.

3. The hologram recording/reproducing apparatus according to claim 2, wherein the length of each pixel of the reference light area is one-nth (n is an integer) the length of each pixel of the signal light area.

4. The hologram recording/reproducing apparatus according to claim 1, further comprising:
    a diffusion plate adjacent to the spatial light modulator;
    wherein a diffusion angle of the diffusion plate opposite to the reference light area is wider than a diffusion angle of the diffusion plate opposite to the signal light area.

5. The hologram recording/reproducing apparatus according to claim 4, wherein:
    the diffusion plate is divided into a plurality of pixel areas each of which gives a different phase shift to light passing through the pixel areas; and
    each pixel of the spatial light modulator corresponds to one pixel area of the diffusion plate in the signal light area, and each pixel of the spatial light modulator corresponds to a plurality of pixel areas of the diffusion plate in the reference light area.

6. The hologram recording/reproducing apparatus according to claim 4, wherein:
    the spatial light modulator includes at least one transparent substrate for sealing a liquid-crystal layer;
    the transparent substrate has an uneven surface which functions as the diffusion plate; and
    the diffusion angle of the uneven surface opposite to the reference light area is wider than the diffusion angle of the uneven surface opposite to the signal light area.

7. The hologram recording/reproducing apparatus according to claim 6, wherein:
    the uneven surface includes a rectangular uneven surface; and
    the unevenness width and/or height of the uneven surface opposite to the reference light area is smaller than the unevenness width and/or height of the uneven surface opposite to the signal light area.

8. The hologram recording/reproducing apparatus according to claim 6, wherein:
    the uneven surface includes a smooth uneven surface; and
    the granularity of the uneven surface opposite to the reference light area is smaller than the granularity of the uneven surface opposite to the signal light area.

9. The hologram recording/reproducing apparatus according to claim 1, wherein the spatial light modulator holds a fixed modulation pattern in the reference light area.

10. The hologram recording/reproducing apparatus according to claim 1, wherein:

the spatial light modulator includes at least one transparent substrate for sealing a liquid-crystal layer;

the transparent substrate has an uneven surface which functions as a diffusion plate; and the diffusion angle of the uneven surface opposite to the reference light area is wider than the diffusion angle of the uneven surface opposite to the signal light area.

11. The hologram recording/reproducing apparatus according to claim 10, wherein:

the uneven surface of the transparent substrate is divided into a plurality of pixel areas each of which gives a different phase shift to light passing through the pixel areas; and each pixel of the spatial light modulator corresponds to one pixel area of the uneven surface of the transparent substrate in the signal light area, and each pixel of the spatial light modulator corresponds to a plurality of pixel areas of the uneven surface of the transparent substrate in the reference light area.

12. The hologram recording/reproducing apparatus according to claim 10, wherein:

the uneven surface includes a rectangular uneven surface; and the unevenness width and/or height of the uneven surface opposite to the reference light area is smaller than the unevenness width and/or height of the uneven surface opposite to the signal light area.

13. The hologram recording/reproducing apparatus according to claim 10, wherein:

the uneven surface includes a smooth uneven surface; and the granularity of the uneven surface opposite to the reference light area is smaller than the granularity of the uneven surface opposite to the signal light area.

14. A hologram recording/reproducing apparatus, comprising:

a coherent light source;

a spatial light modulator which spatially modulates light from the coherent light source;

a Fourier transform lens which concentrates light modulated by the spatial light modulator upon a hologram medium; and a two-dimensional light-receiving element array which receives light from the hologram medium, wherein:

the spatial light modulator is divided into a reference light area and a signal light area;

the divergence angle of reference light emitted from the reference light area is wider than the divergence angle of signal light emitted from the signal light area;

the reference light area and the signal light area are each divided into a plurality of pixels;

said hologram recording/reproducing apparatus further comprises a micro-lens array which includes a plurality of element lenses corresponding to the plurality of pixels and which is adjacent to the spatial light modulator; and the focal length of each element lens of the micro-lens array opposite to the reference light area is shorter than the focal length of each element lens of the micro-lens array opposite to the signal light area.

15. The hologram recording/reproducing apparatus according to claim 14, wherein:

the spatial light modulator includes at least one transparent substrate for sealing a liquid-crystal layer;

the transparent substrate has a convex curved-surface part which functions as an element lens of the micro-lens array; and the focal length of the convex curved-surface part opposite to the reference light area is shorter than the focal length of the convex curved-surface part opposite to the signal light area.

16. A hologram recording/reproducing apparatus, comprising:

a coherent light source;

a spatial light modulator which spatially modulates light from the coherent light source;

a Fourier transform lens which concentrates light modulated by the spatial light modulator upon a hologram medium; and a two-dimensional light-receiving element array which receives light from the hologram medium, wherein:

the spatial light modulator is divided into a reference light area and a signal light area;

the divergence angle of reference light emitted from the reference light area is wider than the divergence angle of signal light emitted from the signal light area;

the spatial light modulator includes a first liquid-crystal layer which modulates the intensity of light and a second liquid-crystal layer which modulates the phase of light;

the second liquid-crystal layer is divided into a reference-light-area liquid-crystal layer located in the reference light area and a signal-light-area liquid-crystal layer located in the signal light area; and a variation in the phase of light at the reference-light-area liquid-crystal layer is larger than a variation in the phase of light at the signal-light-area liquid-crystal layer.

* * * * *